United States Patent
Roos (10) Patent No.: US 6,615,112 B1
(45) Date of Patent: Sep. 2, 2003

(54) METHOD AND DEVICE FOR CALIBRATING ROBOT MEASURING STATIONS, MANIPULATORS AND ASSOCIATED OPTICAL MEASURING DEVICES

(75) Inventor: Eberhard Roos, Friedberg (DE)

(73) Assignee: Kuka Schweissanlagen GmbH (DE)

( * ) Notice: Subject to any disclaimer, the term of this patent is extended or adjusted under 35 U.S.C. 154(b) by 0 days.

(21) Appl. No.: 10/019,345

(22) PCT Filed: Jun. 6, 2000

(86) PCT No.: PCT/EP00/05175
§ 371 (c)(1),
(2), (4) Date: Apr. 1, 2002

(87) PCT Pub. No.: WO01/00370
PCT Pub. Date: Jan. 4, 2001

(30) Foreign Application Priority Data

| Jun. 26, 1999 | (DE) | 299 11 187 U |
| Jul. 8, 1999 | (DE) | 199 31 676 |
| Feb. 24, 2000 | (DE) | 200 03 381 U |

(51) Int. Cl.$^7$ ............. G05B 19/04; G05B 19/18

(52) U.S. Cl. ............. 700/254; 700/245; 700/247; 700/251; 700/252; 700/259; 700/262; 700/264; 310/568.1; 310/568.11; 310/568.14; 901/9; 901/42; 901/47; 396/54; 396/55

(58) Field of Search .......... 700/230, 259, 700/254, 247, 251, 252, 262, 264; 318/568.1, 568.11, 568.14; 901/9, 42, 47; 702/94, 163, 86, 95; 396/54, 55, 233; 348/207.99, 208.8, 208.14

(56) References Cited

U.S. PATENT DOCUMENTS

| 5,041,907 A | 8/1991 | Sager et al. ............. 348/91 |
| 5,297,238 A | 3/1994 | Wang et al. ............. 700/259 |
| 6,078,846 A * | 6/2000 | Greer et al. ............. 700/174 |
| 6,167,607 B1 * | 1/2001 | Pryor ............. 29/407.04 |
| 6,310,644 B1 * | 10/2001 | Keightley ............. 348/159 |
| 6,314,631 B1 * | 11/2001 | Pryor ............. 29/407.04 |
| 6,317,953 B1 * | 11/2001 | Pryor ............. 29/407.04 |
| 6,408,252 B1 * | 6/2002 | De Smet ............. 702/94 |
| 6,429,812 B1 * | 8/2002 | Hoffberg ............. 342/357.1 |
| 6,434,449 B1 * | 8/2002 | De Smet ............. 700/254 |

FOREIGN PATENT DOCUMENTS

| DE | 0 522 411 A1 | 7/1991 |
| DE | 0 763 406 A1 | 3/1997 |
| DE | 299 11 187 U1 | 6/1999 |
| DE | 198 21 873 A1 | 11/1999 |
| JP | 60-37007 | 8/1983 |
| JP | 0 328 687 | 8/1988 |
| JP | 0 470 257 A1 | 2/1991 |
| JP | 0 493 612 | 7/1991 |

OTHER PUBLICATIONS

Fliz et al., Camera system to detect the orientation of a corner cube in real time, 1995, IEEE, pp. 1713–1718.*

(List continued on next page.)

Primary Examiner—William A. Cuchlinski, Jr.
Assistant Examiner—Marc McDieunel
(74) Attorney, Agent, or Firm—McGlew and Tuttle, P.C.

(57) ABSTRACT

A method and device is provided for multistage calibration of multiple-axis measuring robots (6) and associated optical measuring devices (10), especially 3D sensors, in a measuring station (1) for workpieces (2), preferably the bodyshells of motor vehicles. Calibration occurs in a measuring cascade comprising at least three calibrating steps, whereby the optical measuring device (10) and the operating point (28) thereof, the manipulator (6) and the axes thereof and the allocation of the manipulator (6) with respect to the workpiece (2) are successively calibrated. The calibration device (47) includes a control and a calibration system (27) for the operating point (28), a calibration body (15) for the axes of the manipulator and a calibration device (12) for the allocation of the manipulator with respect to the workpiece.

22 Claims, 7 Drawing Sheets

OTHER PUBLICATIONS

Graefe, Calibration–free robots, 1999, Internet, pp. 1–9.*

Zhuang et al., Optimal selection of measurement configuration for robot calibration using simulated annealing, 1994, IEEE, 393–398.*

Loose, D. C., et al. PPA–A Precise, Data Driven Component Tool.

Roger Y. Tsai and Reimar K. Lenz, Jun. 5, 1989, A New Technique for Fully Autonomous and Efficient 3D Robotics Hand/Eye Calibration.

Von Klaus G. Krieg, et al., 1983, Leitfaden der DIN–Normen.

* cited by examiner

METHOD AND DEVICE FOR CALIBRATING ROBOT MEASURING STATIONS, MANIPULATORS AND ASSOCIATED OPTICAL MEASURING DEVICES

FIELD OF THE INVENTION

The present invention pertains to a process and to a device for calibrating robot measuring stations, measuring robots and carried optical measurers calibrating, especially 3D sensors, within a measuring station for said workpieces, especially for vehicle body shells.

BACKGROUND OF THE INVENTION

Robot measuring stations for workpieces, especially for vehicle body shells, in which one or more multiaxial measuring robots are equipped with optical measuring means, e.g., with 3D sensors, have been known from practice. There is a considerable calibration problem in the prior-art measuring stations and their measuring means. Only the measuring robot with its axes is usually calibrated by the using a suitable calibrating tool, with which the optical measuring means is replaced for this purpose, approaching suitable testing bodies, e.g., balls with a known position. The calibration of the monoaxial or multiaxial optical measuring means is also difficult. It has a defined working point, which is called Tool Center Point (abbreviated as TCP) or as Tool Coordinate System (abbreviated as TCS) in the robot program. Such monoaxial or multiaxial optical measuring means may be so-called 3D sensors, measuring cameras or the like. The working point is invisible in such optical measuring tools and it cannot be readily measured. Moreover, all optical sensors differ from one another in that all have a different sensor coordinate system. This is due to the system, on the one hand, and also due to the manufacture, on the other hand. The sensor coordinate system may vary even in identical sensor types. As a result, the measuring sensors are not readily interchangeable. If replacement is necessary in case of defect of a sensor, all working points must be tested in the robot program and possibly corrected one by one in a calibration operation. This diminishes the technical availability of the measuring station. The safety of the process is no longer guaranteed, either.

The measuring robot is calibrated once in the above-described manner prior to the measuring operation, and its axis errors are determined and compensated in the machine data and the control. In addition, a single-time alignment takes place with respect to the workpiece, e.g., by measuring with a higher-level measuring system. It is assumed in the measurement that the single-time adjustment operation is sufficient and the measuring robot will then have sufficient measuring accuracy in its entire work space. However, the measuring precision that can be achieved and the absolute accuracy are limited in practice and subject to the effects of errors, which occur during the operation over a longer period of time and can be attributed, e.g., to heat-dependent changes in the geometry of the robot or even to wear. The measuring precision that can be achieved cannot be guaranteed by a single-time adjustment or calibration.

The calibration of a processing robot with processing tools, e.g., vacuum grippers, welding torches or the like has been known from U.S. Pat. No. 5,297,238. This calibration operation is carried out by means of a camera system used temporarily, which is carried by the robot. The camera system is first calibrated here by the optical measurement of a preset surface with a plurality of defined points, the camera system being flanged to the hand of the yet uncalibrated robot and is brought into an approximately mutually perpendicular position in relation to this surface. Because of the inaccuracy of the robot, the measurement is performed several times and statistically evaluated. The reference of the robot to the environment of the cell is subsequently calibrated with the same camera system. In the third step, the position of the robot is calibrated in the working environment point by point by approaching and measuring a plurality of known points with the camera system and correcting any position deviations of the robot with point-related Cartesian offset. The tools used for the later work of the robot are subsequently also calibrated by means of the camera system.

Other processes for calibrating processing robots with processing tools have been known from the reference sources Loose D. C. et al.: "PPA-A Precise, Data Driven Component Tool," *IEEE Robotics & Automation Magazine*, US, IEEE Service Center, Piscataway, N.J., Vol. 1, No. 1, Mar. 1, 1994, pages 6 to 12, and TSAI R. Y. et al.: "A New Technique for Fully Autonomous and Efficient 3D Robotics Hand/Eye Calibration," *IEEE Transactions on Robotics and Automation*, U.S., IEEE Inc., New York, Vol. 5, No. 3, Jun. 1, 1989, pages 345 to 358. External camera systems and a camera carried next to the tool on the robot hand used to guide the tool are used for the calibration.

SUMMARY OF THE INVENTION

The object of the present invention is therefore to show an improved process with a device for calibration.

According to the invention, a process is provided for calibrating multiaxial measuring robots and carried optical measuring devices, especially 3D sensors for a measuring station for workpieces, especially for vehicle body shells. The calibration takes place in a measuring cascade with at least three calibration steps, wherein the optical measuring device with its working point, the measuring robot with its axes and then the assignment of the said measuring robot to the workpiece are calibrated one after another.

According to another aspect of the invention, a device is provided for the multistep calibration of multiaxial measuring robots and a carried optical measuring device such as a 3D sensor. The device is provided particularly for a measuring station for workpieces such as vehicle body shells. The device has a testing device for calibrating the working point of the optical measuring device, a calibrating body for calibrating the robot axes, and a calibrating device for the calibration of the assignment of the measuring robot to the workpiece.

The calibration in the measuring cascade with at least three calibration steps has the advantage that, on the one hand, the accuracy of calibration and measurement is substantially increased. An accuracy of approx. 0.05 mm can be reached in the individual calibration steps, which leads to an overall accuracy of approx. 0.1 mm for the entire measuring system comprising the measuring robot and the optical measuring device. Possible errors can be reliably recognized and specifically assigned to defined causes of error in the multiaxial calibration. This permits specific error corrective actions and makes possible the above-mentioned increase in accuracy.

A specific limiting of the causes of error is also possible with the measuring cascade. It is meaningful for this purpose for the first calibration step to concern the optical measuring device with its working point. Other causes of error, which originate from the measuring robot or from the measuring station, are eliminated in this calibration. The measuring robot with its axes is calibrated in the second step. The axis calibration of the robots is performed with the above-mentioned calibrated optical measuring tool. Effects of errors from the optical measuring tool are now ruled out. The measuring station has no effect, either. The third calibration step concerns the checking of the geometry of the station or cell and the assignment of the measuring robot to the workpiece or to the workpiece mount. The first two calibration steps make it possible to perform this checking of the cell geometry with the measuring robot and its optical measuring device. An additional and complicated external measurement can be eliminated. The two previous calibration steps offer high accuracy for the third calibration step as well.

The circumstance that the three-step calibration with the measuring cascade can be performed not only once at the beginning at the time of the setting up of the measuring station, but also at any time during the measuring operation, is of particular advantage. The calibration is simple, takes little time and requires only a low design effort. Due to the fact that calibration is possible at any time, the process safety of a robot measuring station is guaranteed to a sufficient extent for the first time ever. In particular, this also ensures the feasibility of the process to a sufficient extent. This is important especially because of the increasing accuracy requirements on the quality of workpieces and especially vehicle bodies.

Due to the high accuracy of measurement and calibration as well as the low design effort and time requirement, workpiece measurements can be performed more frequently. As a result, a measurement can be performed not only on the finished vehicle body but also some steps before during the manufacture of the components, so that errors and rejects can be recognized and eliminated in time. In particular, causes of errors can also be better assigned as a result in the workpieces or components and can be corrected more easily and more specifically. In addition, workpiece or component measurements can be carried out more frequently on a larger number of workpieces or components due to the lower time requirement.

There are further advantages in the possibility of having the calibration performed by mechanics or workmen without special measuring technical knowledge and without complicated numeric optimization programs. Furthermore, it is possible in robot measuring stations to implement a consistent CAD/CAM process chain for performing the measurement with measuring robots in conjunction with a data record. Without an exactly defined TCP, only a comparative measurement is possible on a sample workpiece, especially a sample body. In addition, the present invention makes possible the step from pure process monitoring in production (i.e., the checking whether a component is O.K. or not) to the robot-supported measurement of workpieces or components of any degree of complexity.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
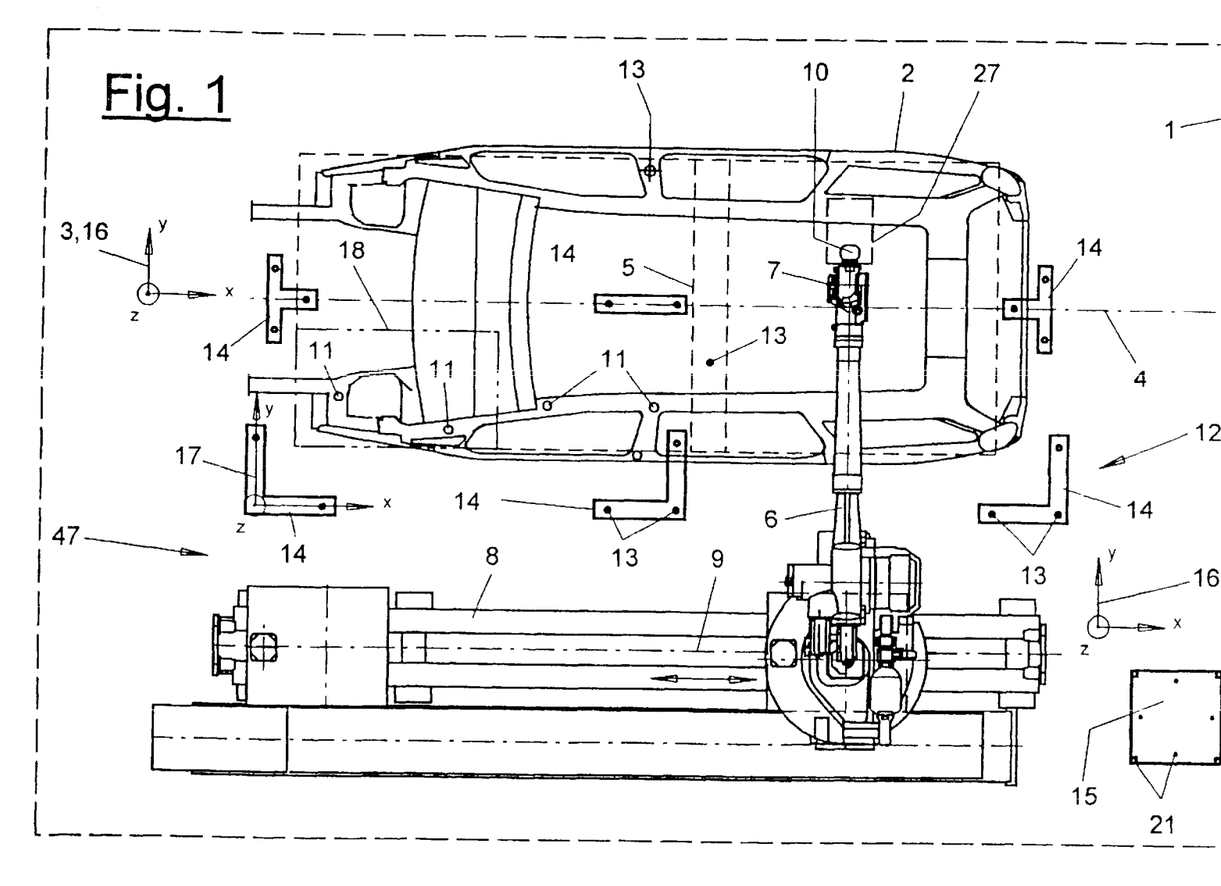
FIG. 1 is a top view of a processing or measuring station with a measuring robot, an optical measuring device and a device for the multistep calibration of these components.
Figure 2:
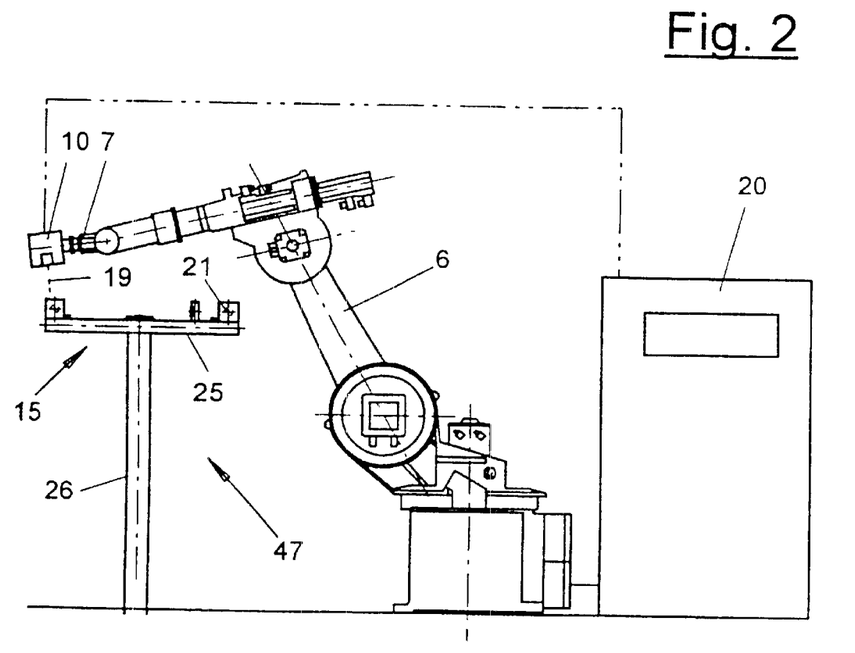
FIG. 2 is a side view of the measuring robot with a calibrating body.

Referring to the drawings in particular, the processing or measuring station 1 shown in FIG. 1 is used to measure any workpieces 2. These are preferably the vehicle body shells shown in the drawing and their components, which are brought, e.g., along a transfer line 4 into the measuring station 1 and are again removed. The measuring station 1 may be designed as an independent station. However, it may also be integrated within a processing or manufacturing station, where the measurement takes place during or at the end of the manufacturing process.

The measurement is carried out by means of a multiaxial measuring robot 6, which may have any desired design. In the exemplary embodiment being shown, it has six rotatory axes. In addition, it may also have one or more translatory axes, e.g., an additional travel axis 9. In the exemplary embodiment being shown, the measuring robot 6 is mounted on a linear unit 8 and can be moved forward and backward with same by a translatory movement along the axis 9 in relation to the workpiece 2. The travel axis 9 and the linear unit 8 are preferably directed in parallel to the transfer line 4. The working area of the measuring robot 6 is enlarged by means of the one or more travel axes 9.

Only one measuring robot 6 is shown in FIG. 1 for clarity's sake. A second measuring robot 6 of the same or similar design may be arranged on the opposite side. Moreover, additional measuring robots 6 may be present as well.

The individual measuring robot 6 carries on its robot hand 7 a suitable measuring tool, which is flanged on directly or is connected to the robot hand 7 via a change coupling. It is an optical measuring device 10 here, e.g., a so-called 3D sensor or a measuring camera with three Cartesian translatory measuring axes. As a result, measuring points 11 or measured objects on the vehicle body shell or on another workpiece 2 can be measured three-dimensionally. The optical measuring device 10 may optionally be replaced with another tool if the measurement is integrated within the manufacturing process.

The measuring robot 6 has a control 20 with a computing unit, in which the calculations necessary for the measurement are performed. The calibration calculations can also be carried out in the control with known algorithms. The 3D sensor 10 is connected to the control 20 via a line.

The workpiece 2 is arranged on a workpiece holder 5, e.g., a so-called skid for vehicle bodies, and is moved with same along the transfer line 4. One or more defined measuring points 11, which are relevant for the geometry of the workpiece and must have a defined spatial position, are located on the workpiece 2. In the vehicle body 2 being shown, these are, e.g., holes, humps, edges or the like in defined areas of the body. They may also be reference points of the body which are in a defined relationship to a vehicle coordinate system 3. Before and during the measurement of the workpieces 2, the measuring robot 6 with its 3D sensor 10 is calibrated by means of a multistep calibrating device 47 in a measuring cascade with at least three calibration steps. The optical measuring device 10 with its working point 28, the measuring robot 6 with its axes and then the assignment of the measuring robot 6 to the workpiece 2 are now calibrated one after another. The multistep calibrating device 47 comprises a testing device 27 for calibrating the optical measuring device 10, a calibrating body 15 for calibrating the measuring robot 6 and its axes, and a calibrating device 12 for calibrating the assignment between the measuring robot 6 and the workpiece 2.

Due to the multistep and hierarchically organized calibration, errors can be recognized in a cause-related manner and specifically corrected. As a result, the overall accuracy of the measuring unit comprising the measuring robot 6 and the optical measuring device 10 can be increased to 0.1 mm. This calibration is used to ensure the process reliability of the measuring station 1 and the measuring accuracy of the overall system comprising the measuring robot 6, the optical measuring device 10 and the station environment.

If exceeding of a tolerance is observed on the workpiece 2 during the measuring operation, the measuring accuracy can be checked immediately on the site with the multistep calibration to be described in greater detail below and the cause of the measured deviation that occurred during the measuring operation can thus be verified. It can be immediately determined whether the error of measurement is to be attributed to an error on the workpiece 2 or it has its cause in the measuring system. In addition, the calibration may also be performed at defined intervals or even irregularly in order to ensure the process reliability or the feasibility of the process in the sense described in the introduction.

The first calibration step concerns the optical measuring device. This has a working point 28 or so-called Tool Center Point (abbreviated as TCP), which is located at a defined distance in front of the optical measuring device 10 in the measuring direction 19. To measure the workpiece, the measuring robot 6 moves the optical measuring device 10 with its working point 28 to the points to be measured and optically scans the measuring points 11 there. The measuring point 11 is measured now three-dimensionally and displayed with its coordinates in any suitable coordinate system, e.g., a vehicle coordinate system 3. The coordinates of the working point 28 are usually defined in the flange coordinate system of the measuring robot 6. During the measurement of the workpiece 2, the path coordinates of the measuring robot 6 and the working point coordinates are recorded and optionally correspondingly transformed. The measuring robot 6 usually performs the measurements with reference to its basic coordinate system or to a world coordinate system 16 of the measuring station 1. The coordinates of the measuring points 11, which are related to this, are then converted into the coordinates of the vehicle coordinate system 3. The world coordinate system 16 and the vehicle coordinate system 3 are frequently combined in practice.

The optical measuring device 10 is accommodated in an exactly defined position and orientation in a frame 31 of any desired design, which can be mounted on an adapter flange 29 of the robot hand 7 by means of a rear connection plate 30. The frame 31 may have a housing 46, which protectively surrounds the measuring device 10. A line holder 45 may be present on the frame 31 for the cable connection. The optical measuring device 10 is arranged, e.g., obliquely on the frame 31, so that its measuring direction 19 extends obliquely to the central axis of the connection plate 30 and of the adapter flange 29.

The optical measuring device 10 is connected to an evaluating and display unit, not shown, wherein the measured data can be entered, on the one hand, into a process and robot control and, on the other hand, they can also be displayed on a suitable display, e.g., on a monitor for visualization. In case of a suitable design of the measuring device 10, the operator can also see, e.g., an image of the area of the workpiece just scanned and measured. The optical measuring device 10 may image cross hairs or another target marking on the monitor, which marks the working point 28 or the TCP. In addition, the operator can also control the measuring robot 6 with the measuring device 10 manually via the monitor and thus bring the measuring device 10 with its working point 28 to the desired point and cause the working point 28 to overlap the measuring point 11 being sought on the workpiece. The monitor with the sight or target display may also be used for the testing device 27 to be described in detail below.

The testing device 27 comprises a holder 32, which carries a reference sample 33, which preferably corresponds in terms of type and size to the measuring points 11 or measured objects which the measuring robot 6 usually measures in the measuring station 1. In the exemplary embodiment being shown, the reference sample 33 is a hole in a sample plate 34. As an alternative, it may also be a hump, a cone, an edge or the like.

The testing device 27 also contains an adjusting device 35, with which a relative adjustment is possible between the reference sample 33 and the optical measuring device 10. In the embodiment being shown, the adjusting device 35 is associated with the holder 32. The adjusting device 35 preferably has at least as many adjusting axes 39, 40, 41 as the optical measuring device 10 has optical measuring axes. The adjusting axes 39, 40, 41 and the optical measuring axes are, moreover, directed and oriented in the same manner.

Figure 7:
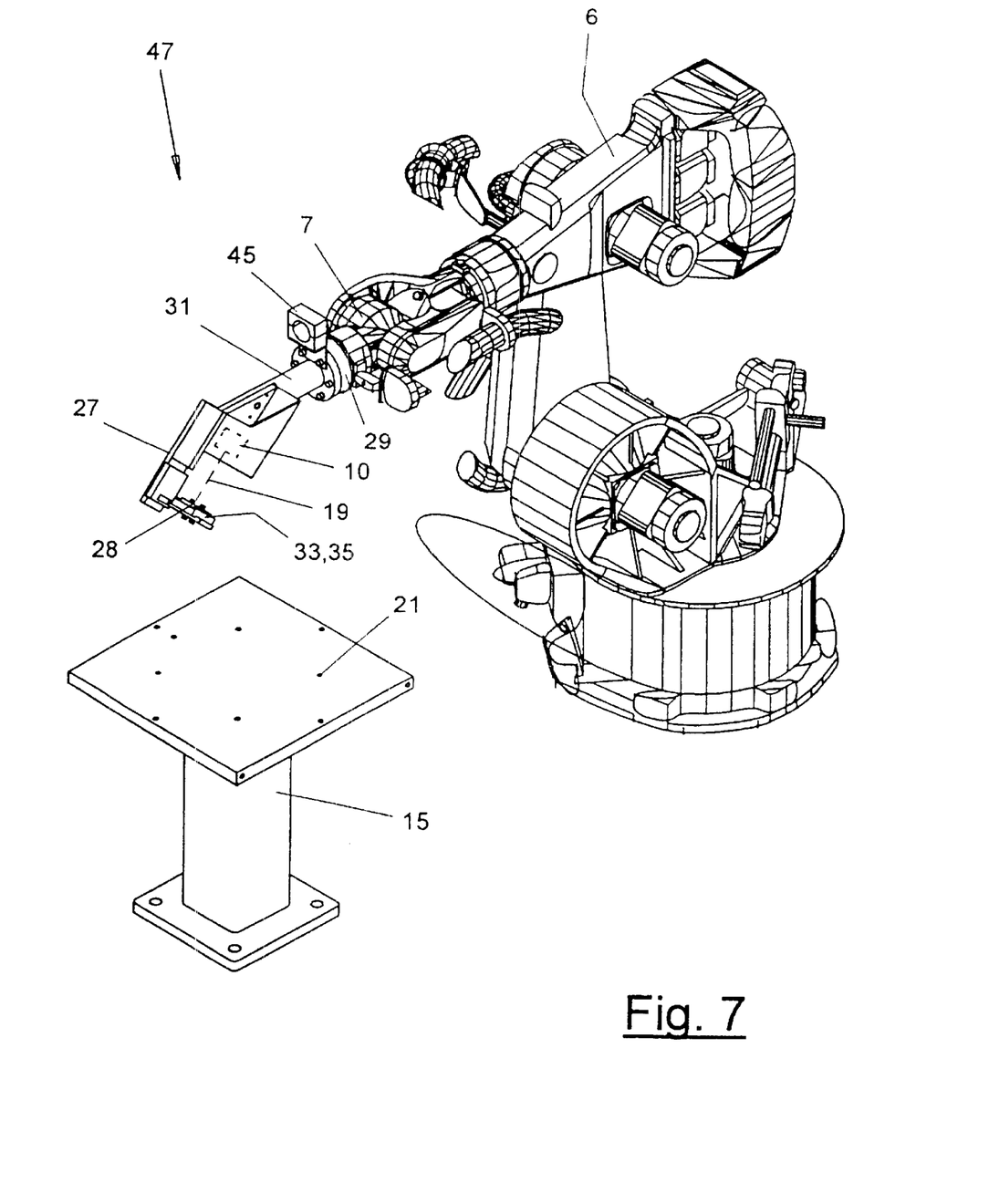
FIG. 7 is a perspective view of the measuring robot with the optical measuring device and a testing device for the calibration of the working point.

The holder 32 temporarily brings the reference sample 33 to the working point 28 in front of the optical measuring device 10 for the testing and calibration operation. For the normal measuring operation, the reference sample 33 must then be removed. The holder 32 may be arranged or mounted for this purpose either detachably or movably to and fro between an inoperative position and a testing position on the frame 31 of the measuring device 10. In the testing position shown in FIG. 7, the holder 32 assumes an exactly defined position in relation to the frame 31. In the embodiment being shown, the holder 32 is arranged detachably and has a corresponding fastening 36 for accurate positioning on the frame 31.

The holder 32 has a longitudinal arm 37, which extends essentially in parallel to the longitudinal axis of the frame 31 or the measuring direction 19. The longitudinal arm 37 extends somewhat beyond the frame 31 and the optical measuring device 10 in the measuring direction 19. A cross arm 38, which is preferably arranged at right angles to the longitudinal arm 37, is located at the front end. The angle depends on the position and orientation of the optical measuring axes and frame axes 39, 40, 41.

Figure 8:
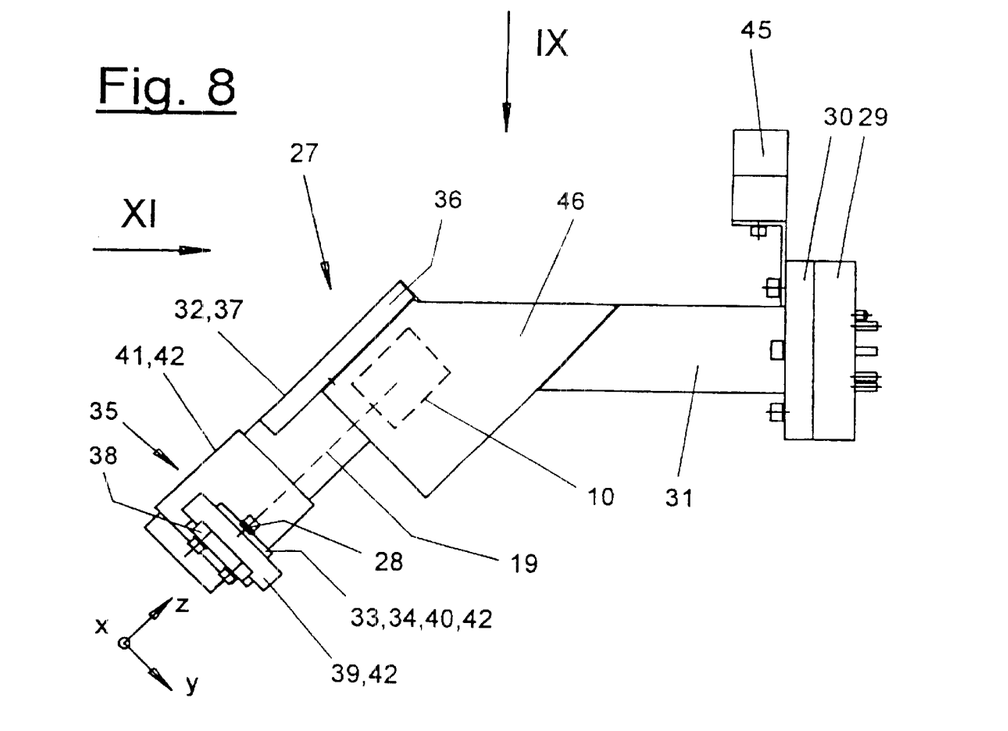
FIG. 8 is a side view of the testing device from FIG. 7.
Figure 9:
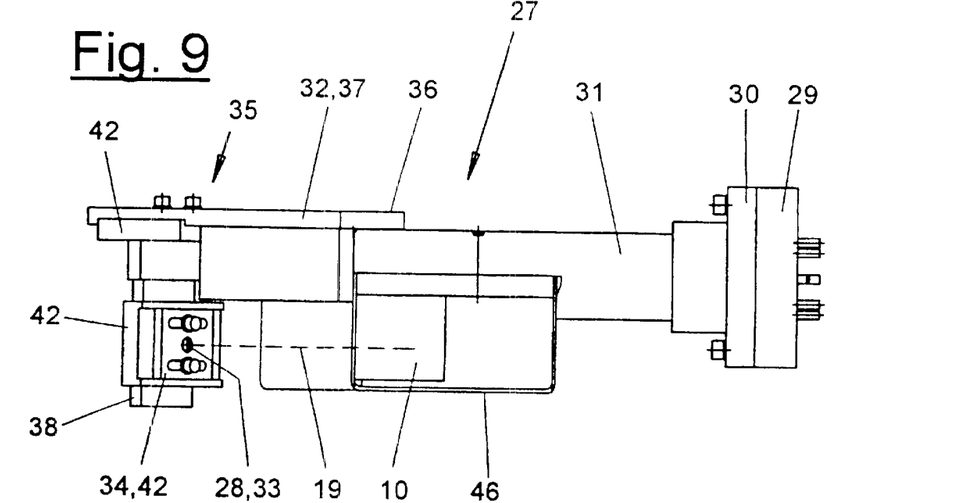
FIG. 9 is a top view of the testing device from FIG. 8 according to arrow IX.
Figure 10:
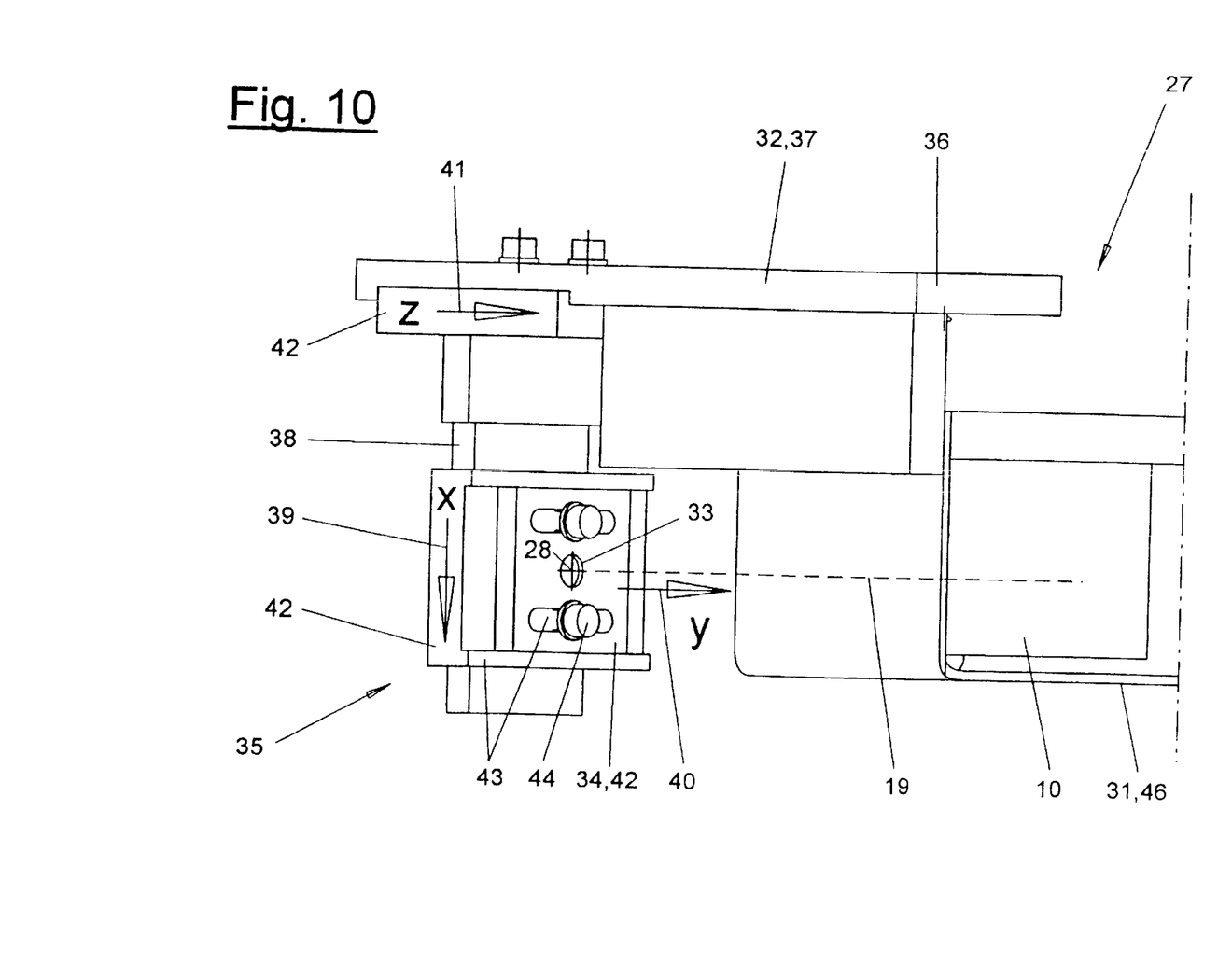
FIG. 10 is an enlarged detail of the arrangement according to FIG. 8.
Figures 11, 12:
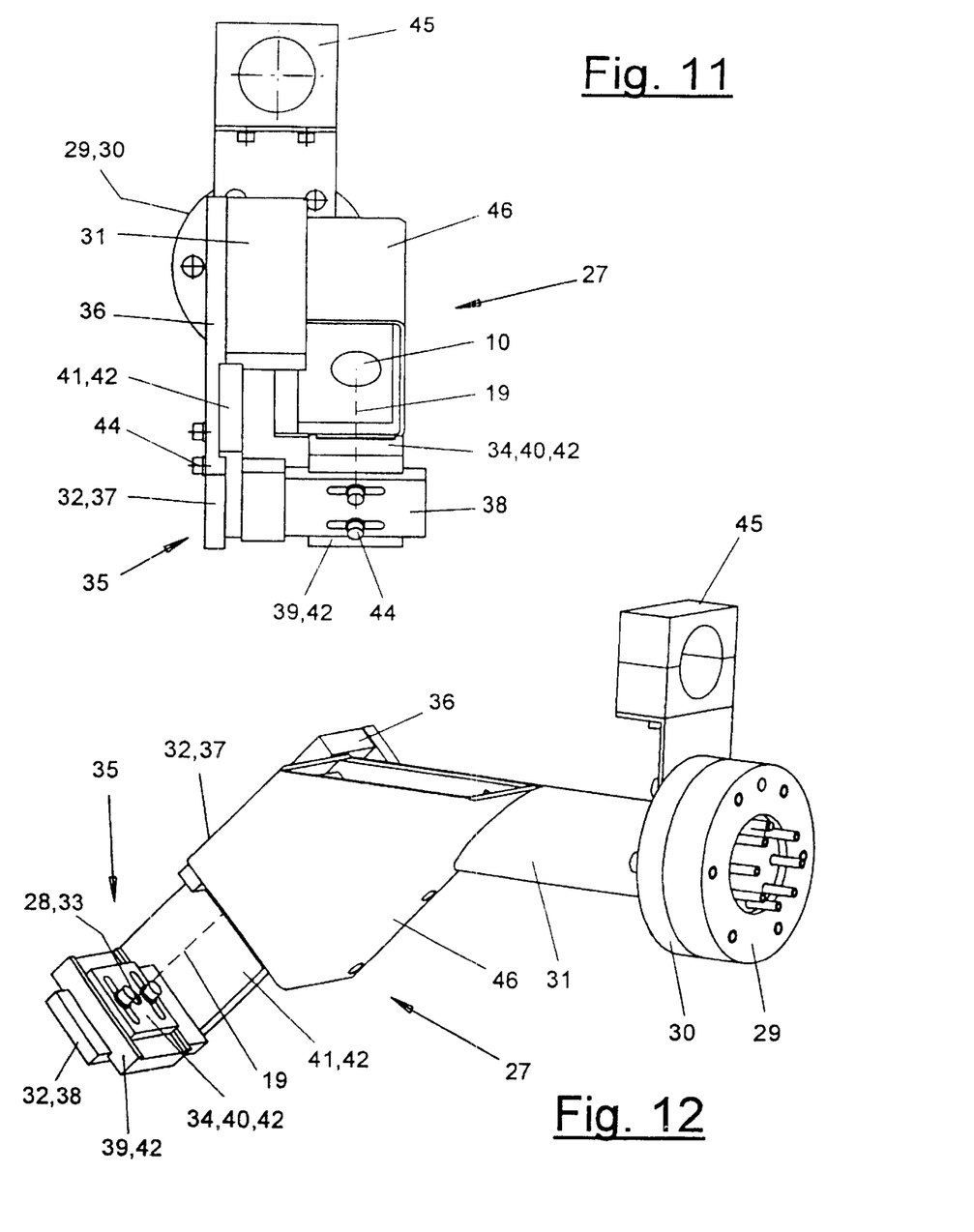
FIG. 11 is a front view of the testing device according to arrow XI in FIG. 8.
FIG. 12 is a perspective view of the testing device from FIGS. 8 through 11 as viewed obliquely from behind.

The adjusting device 35 associated with the holder 32 comprises a plurality of adjusting carriages 42, which are movable in relation to one another in three Cartesian adjusting axes 39, 40, 41 in the embodiment being shown. FIGS. 8 and 10 show the details for this.

The cross arm 38 is fastened to an adjusting carriage 42, which is mounted on the longitudinal arm 37 displaceably in the Z direction with the adjusting axis 41. The adjusting axis 41 or the Z axis extends along the measuring direction 19 and defines the distance between the working point 28 and the optical measuring device 10. The adjusting carriage 42 is guided exactly in a corresponding guide not shown in the direction of the Z axis and can be fixed at the desired position by means of a fixing device 44, e.g., by means of two tightening screws.

Another adjusting carriage 42, which can move in the direction of the adjusting axis 39 or the X axis at right angles to the measuring direction 19, is mounted on the cross arm 38 displaceably and with exact guiding. A suitable fixing device 44 with tightening screws or the like is present here as well.

The third adjusting carriage 42 is formed by the sample plate 34 with the reference sample 33 and is mounted on the adjusting carriage 42 displaceable in the X direction at the cross arm 38 in a transversely displaceable manner. The sample plate 34 or the adjusting carriage 42 formed hereby can be moved in the direction of the adjusting axis 40 or the Y axis at right angles to the measuring direction 19. The sample plate 34 is guided exactly in the axial direction by means of lateral guides 43 and is fastened by means of a fixing device 44 with tightening screws or the like. The tightening screws 44 may engage elongated holes extending in parallel to the adjusting axis through the respective adjusting carriage 42.

For the first-time adjustment or calibration of the testing device 27, the holder 32 is first mounted on the frame 31 and the reference sample 33 is subsequently brought to the position of the working point 28 of the optical measuring device 10 by displacing the adjusting carriages 42 in the three adjusting axes 39, 40, 41. The adjustment of the carriage can be checked optically in the above-described manner by means of the monitor by causing the reference sample 33 to overlap the target display or the cross hairs of the optical measuring device 10. However, the checking may also be carried out in another manner. The adjusting carriages 42 are then permanently fixed in the correct position by means of the fixing device 44. The frame 31 with the optical measuring device 10 and the mounted testing device 27 can then be accurately measured on a suitable measuring machine, e.g., a coordinate measuring machine, wherein the coordinates of the working point or TCP 28 are accurately measured and determined relative to the flange coordinate system of the robot hand 7 or to another suitable coordinate system. The TCP coordinates can then be marked by means of a plaque or the like on the frame 31 and on the testing device 27. After the adjustment and measurement, the testing device 27 can be removed and put aside. The measured TCP coordinates are entered into the robot control. The normal measuring operation can then be performed.

To guarantee the process reliability, it is important to check the measuring device 10 and the position of the working point 28 on the above-mentioned occasions and to recalibrate them if necessary. Such a checking is also carried out in case of possible collisions of the measuring robot 6. The testing device 27 with the holder 32 is mounted in this case on the frame 31 in the accurate position. The fixed reference sample 33 is at the desired position of the working point 28. It can be determined by optical comparison or also by measuring comparison by actuating the measuring device 10 whether the actual position of the working point 28 still agrees with the measured desired position. If not, readjustment is necessary in the above-described manner and a new measurement must be performed.

A similar procedure is followed when the optical measuring device 10 must be replaced in case of damage or for other reasons. The new measuring device 10 usually has a different working point 28. After the replacement, the above-described adjustment operation is again to be performed with the subsequent measurement and determination of the TCP coordinates. The adjusting carriages 42 and the reference sample 33 are then fixed in the new position during the above-mentioned readjustments. The adjusted testing device 27 can then be removed and stored for later checking. Its assignment to the optical measuring device 10 and the frame 31 is marked.

A second optical measuring device 10 with the frame 31 and the corresponding testing device 27 can also be adjusted and measured in the above-described manner for a rapid replacement of the device in case of major damage and collisions. It can be rapidly replaced with the damaged device in case of collision, and only the changed TCP coordinates, which are marked on the replacement device, are entered in the robot control by the operator for correcting the path values. The measuring operation can then be resumed immediately. The necessary interruption of the measuring operation is very short.

The adjustment of the testing device 27 and the checking of the desired and actual positions of the working point 28 can be performed on an optical measuring device 10 mounted on the measuring robot 6. As an alternative, the optical measuring device 10 may also be removed from the measuring robot 6 for the adjustment and checking.

In another design variant, not shown, the adjusting device 35 is assigned to the optical measuring device 10. As a result, the measuring device 10 can be displaced in the said adjusting axes 39, 40, 41 and fixed. The holder 32 with the longitudinal and cross arms 37, 38 and with the sample plate 34 with the reference sample 33 may be rigid in this case. The reference sample 33 permanently presets the desired position of the working point 28 and the TCP coordinates. The optical measuring device 10 is then adjusted to the preset position of the working point 28 by means of the adjusting device 35, and the desired and actual positions of the working point 28 are caused to overlap. Calibration and adjustment are possible at the same time during the checking of the working point 28 with this design. A separate measurement of the optical measuring device 10 with the frame 31 and with the testing device 27 is not necessary in this case. As soon as the desired and actual positions of the working point 28 have been caused to overlap, the TCP coordinates determined for this in advance are set as well. This calibration or adjustment can be performed in the mounted position of the measuring robot 6. A separate measurement on a coordinate measuring machine is unnecessary. The second calibration step concerns the measuring robot 6 and a compensation of its relative axis errors e.g., Denavit-Hartenberg parameters. The axis calibration of the measuring robot 6 is performed by means of the calibrating body 15, which is shown in an enlarged form in FIGS. 2 through 6.

The calibrating body 15 is designed, e.g., as a calibrating table and comprises a carrier plate 25 or any other carrier body with at least one flat surface, on which the measuring marks 21 explained in greater detail below are arranged. The carrier plate 25 is arranged in a stationarily positionable manner by means of a frame 26, e.g., a support column. The stationarily positioned calibrating body 15 is measured in a suitable manner in reference to the ruling coordinate system of the measuring station, preferably the world coordinate system or the basic coordinate system of the measuring robot 6, so that the measuring marks 21 have a known position that can be determined very accurately in this coordinate system.

On the surface of the carrier plate 25, the calibrating body 15 has a plurality of measuring marks 21, which may be arranged horizontally and/or upright. The measuring marks 21 form measuring points 24, which are approached and measured by the measuring robot 6 with the 3D sensor with different orientations of its axes and components. A plurality of measurements can therefore be performed with different robot orientations at one measuring mark 21. A plurality of measuring points 24 are correspondingly obtained from one measuring mark 21. Thirty or more measuring points 24 are preferably recorded on the calibrating body 15 for one calibration. At least some of the measuring marks 21 and preferably all measuring marks 21 have a rotationally symmetrical, flat contour. The measuring marks 21 may be designed, e.g., as thin circular plates or as circular openings. They have a different color or brightness recognizable to the 3D sensor 10 compared with the environment. They are preferably designed and arranged especially such that the 3D sensor 10 can optically reliably detect the rotationally symmetrical edges of the measuring marks 21 against the environment and measure them in terms of their position and orientation.

During the approach to and measurement of the measuring marks 21, the measuring robot 6 moves the 3D sensor 10 into desired positions with desired orientations relative to the known position and orientation of the measuring mark 21 approached. The measuring marks 21 now always appear in the same position in the same shape and size from all directions of view of the 3D sensor 10. As circular, flat marks, they have the advantage that they are recognized by the measuring tool 10 as circles or ellipses from each orientation, and the center can be detected and calculated without major effort.

If the measuring robot 6 does not find the measuring mark 21 in the expected position but in another position due to positioning errors in its axes, due to changes in length caused by thermal effects in its components or because of other causes of error, the positioning error can be calculated from the offset based on known calibration algorithms. The existing positioning errors of the measuring robot 6 can then be determined from a plurality of such measuring and calculation operations and compensated at the measuring robot 6 with a corresponding correction of its machine data.

Figure 3:
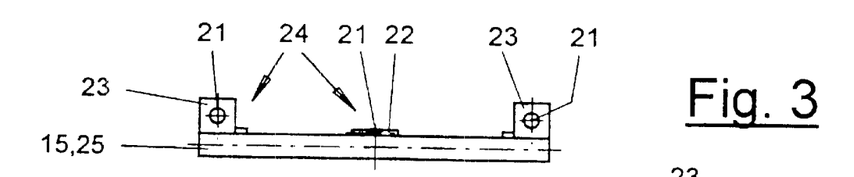
FIG. 3 is a side view of the calibrating body.
Figure 4:
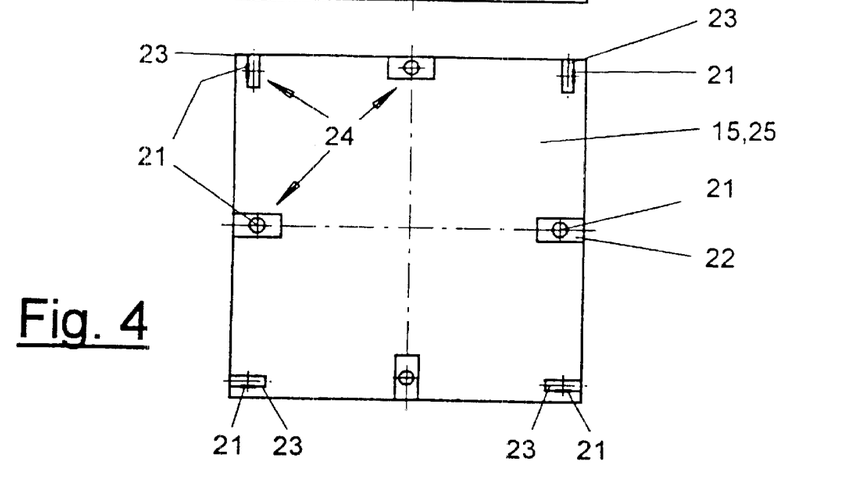
FIG. 4 is a top view of the calibrating body.

In the exemplary embodiment shown in FIGS. 3 and 4, some of the measuring marks 21 are arranged on mark holders 23, which stand preferably vertically on the plate surface and are fastened in a suitable manner on a relatively thin carrier plate 25. The fastening may be performed by bonding or in another suitable manner. The horizontal measuring marks 21 may be arranged directly on the carrier plate 25 as small plates or as holes. However, they may also be located on horizontal mark holders 22 in the embodiment being shown as well. All the measuring marks 21 preferably have the same shape and size as each other. One measuring mark 21 is preferably arranged at each mark holder 22, 23.

The measuring marks 21 and their mark holders 22, 23 are distributed at the edge or on the circumference of the carrier plate 25 and arranged at mutually spaced locations. The distribution may be essentially regular, but some of the distances may differ. The measuring marks 21 are preferably arranged such that the measuring marks 21 alternatingly have different orientations. Measuring marks 21 that are upright or horizontal in the circumferential direction preferably alternate with one another. The upright measuring marks 21 are, moreover, preferably arranged on different sides of their mark holders 23. The upright mark holders 23 are rotated by 90° in relation to one another. Preferably all the upright measuring marks 21 point to the outside, but they may also have a different orientation.

Figure 5:
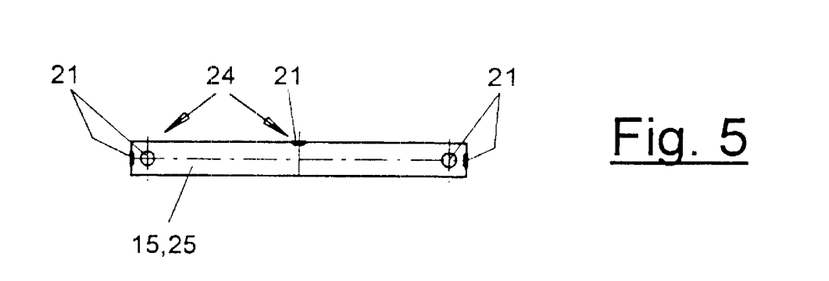
FIG. 5 is a side view of a variant of the calibrating body from FIGS. 3 and 4.
Figure 6:
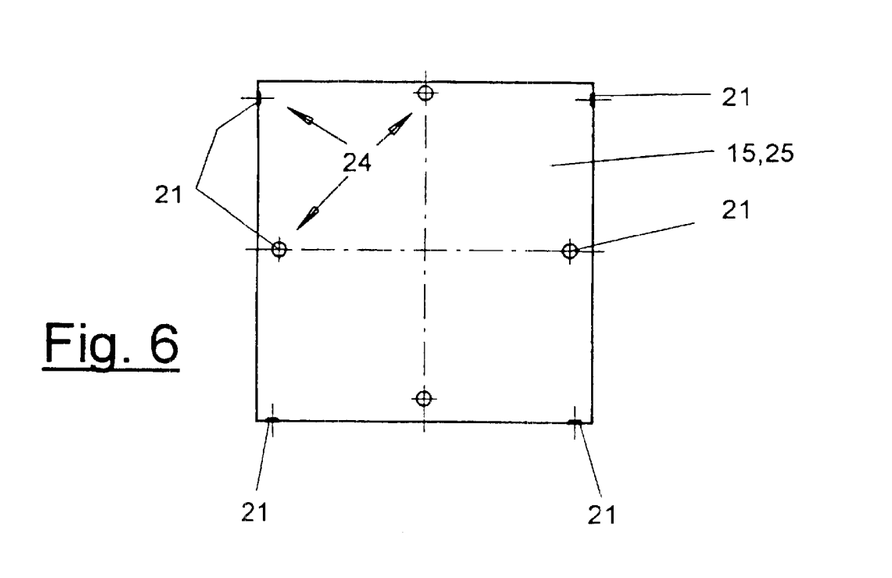
FIG. 6 is a top view of a variant of the calibrating body from FIGS. 3 and 4.

FIGS. 5 and 6 show a variant of the calibrating body 15. This comprises a thicker carrier plate 25, on the cover and side surfaces of which the measuring marks 21 are arranged directly. The carrier plate 25 is made of a suitable, dimensionally stable material, e.g., a nonwarping metal alloy. The measuring marks 21 preferably have the shape of circular flat openings or depressions, which are, e.g., milled in. The bottom of the depression may be flat.

As an alternative, the measuring marks 21 may also consist of small plates, color marks or the like. The depressions or measuring marks 21 may be arranged and distributed in the same manner as in the exemplary embodiment shown in FIGS. 3 and 4.

The calibrating body 15 has at least three measuring marks 21 or measuring points 24 for the desired error assignment and the robot kinematics shown. Fewer measuring marks 21 or measuring points 24 may also suffice for a robot kinematics with fewer degrees of freedom. Eight or more measuring marks 21 or measuring points 24 with different positions and orientations are present in the preferred embodiment for the measuring robot 6 shown in an optimized embodiment. Their number may also be greater than eight.

The calibrating body 15 or its carrier plate 25 has a comparatively small extension and has an edge length of approx. 500–600 mm in the preferred embodiment being shown with the essentially square plate shape. As a result, the calibrating body 15 is so small with its column foot that it can be accommodated within the measuring station in any suitable area in the working range of the measuring robot 6. A plurality of such calibrating bodies 15 may also be present within the measuring station 1. This is especially true when the measuring robot 6 has one or more additional translatory displacement axes 9.

The third calibration step concerns the assignment of the measuring robot 6 and of the optical measuring device 10 to the workpiece 2. This assignment may change for various reasons. On the one hand, there is a change over the additional travel axis 9. In addition, a stationarily arranged measuring robot 6 may, however, also lose the correct assignment to the workpiece 2 due to settling on its foundation or for other reasons. The calibrating device 12 described in greater detail below is used for this third calibration step.

A plurality of calibration marks 13 are arranged in the measuring station 1 in the vicinity of the measuring points 11 or of the measured spaces at the workpiece 2. They are located laterally next to or under the workpiece 2. Calibration marks 13 may also be arranged on the workpiece 2 itself and they define, e.g., preset, so-called reference position system points RPS on the workpiece 2. They may be, e.g., reference holes on the vehicle body shell.

The calibration marks 13 are part of the calibrating device 12, which may also have a plurality of mark carriers 14 with three respective calibration marks 13, which said mark carriers are arranged stationarily in exactly known positions. The mark carriers 14 have, e.g., an angular shape, and the calibration marks 13 are arranged in the corner area and at the ends of the legs. As an alternative, the mark carriers 14 may also have a T shape with three calibration marks 13 at the ends of the legs or a simple bar shape with two calibration marks 13. The calibration marks 13 may be arranged on the mark carriers 14 at the same level or at different levels.

In addition, one or more calibration marks 13 may be arranged on the workpiece holder 5 or the workpiece baseplate. As is illustrated in FIG. 1, one calibration mark 13 is fastened, e.g., to the cross strut of the skid. This calibration mark 13 is also located in space in the vicinity of one or more measuring points 11 on the vehicle body 2.

The calibration marks 13 may have the same design as the above-described measuring marks 21 on the calibrating body 15 and they likewise preferably have a circular shape or contour. They consist of openings in the mark carriers 14 or the workpiece holder 5 or circular leaves applied. As an alternative, they may also be color marks or the like. The calibration marks 13 are optically detectable marks.

As an alternative, the calibration marks 13 may also have any other design depending on the type of the measuring tool 10. Moreover, only some of them are shown in FIG. 1. Similar calibration marks 13 may be located on the other side of the body, i.e., displaced in the +y direction as well as in the +z direction.

The measuring robot 6 performs an absolute measurement at the measuring points 11. The absolute positioning and measuring accuracy of the measuring robot can be improved, checked and secured with the calibration marks 13 by reducing the size of the work space to small partial work spaces 18. Due to their known position and their vicinity to the measuring points 11 of the workpiece 2, the positioning errors that may occur: at the measuring robot 6 in the range of movement and in the range of the extension arm up to the calibration marks 13 can be recognized and compensated. An error that may possibly occur over the remaining residual displacement from the calibration marks 13 to the measuring points 11 is minimal.

In addition, a preferably Cartesian measuring coordinate system 17, in which the measurements are performed within the corresponding partial working area 18, is spanned on the calibration marks. Simple coordinate transformation of the measured measuring point coordinates into the vehicle coordinate system 3 or another desired coordinate system is possible due to the known absolute position of the calibration marks 13 and of the measuring coordinate system 17.

For the calibration, the measuring robot 6 approaches the calibration marks on the calibration body 15, measures same, calculates possible positioning errors herefrom, compensates these errors in the machine data by means of suitable calculation and control programs in the robot control global compensation of the positioning errors of the robot.

During the local compensation, which is used to additionally improve the absolute positioning accuracy, the measuring robot 6 with its measuring tool 10 approaches one or more, preferably all mark carriers 14 of the partial work space and measures at least three calibration marks 13 located there. The measuring robot 6 is now calibrated and "zeroed." Its desired coordinates, determined for the calibration marks 13 in the robot control, are overwritten during the calibration with the space coordinates of the calibration marks 13 which are known from the measurement.

Three calibration marks 13 each span the local measuring coordinate system 17. The calibration operation may also be repeated once or several times during the serial measuring operation. The effects of absolute errors that may occur during the operation, e.g., changes caused by wear in the components of the robot, are now detected and compensated.

The working and measuring area of the measuring robot or measuring robots 6 can be enlarged by means of the travel axis axes 9, on the one hand, and by a displacing movement of the workpiece carrier 5 with the workpiece 2, on the other hand. When such a relative movement takes place between the measuring robot 6 and the workpiece 2, a calibration is carried out after the end of the movement and before the measuring operations are performed. When the measuring robot 6 is moving along its travel axis axes 9, it calibrates itself at one or more stationary mark carriers 14 and their calibration marks 13. When the workpiece 2 is moving, the calibration takes place by means of one or more calibration marks 13 on the workpiece carrier 5. Despite the enlargement of the work space by a travel axis 9, the measuring accuracy is not impaired as a consequence of the local calibration in the immediate vicinity of the component. Moreover, the position of the workpiece 2 and of the workpiece carrier 5 can be recorded by means of these calibration marks 13 on the workpiece carrier 5 and used for the measurement of the measuring points 11. Exact determination of the current position of the component in relation of the world coordinate system or the robot basis coordinate system is thus performed.

Various modifications of the embodiment shown are possible. On the one hand, the design and the number of the workpieces 2 and their transport may vary. The number and the design of the measuring robots 6 are also variable. The measuring robot 6 may also be designed as a simple prime mover, e.g., as a cross slide or the like, instead of as a multiaxial industrial articulated arm robot.

The optical measuring device 10 may also have a different design and also have a different number and orientation of its optical measuring axes. The adjusting axes 39, 40, 41 of the adjusting device 35 also change accordingly. The number and orientation of the adjusting axes and the optical measuring axes are preferably the same. However, as an alternative, the adjusting device 35 may also have more or fewer adjusting axes and a different orientation of its adjusting axes. The design embodiment of the adjusting device 35 is also variable. This also applies to the design embodiment of the testing device 27 with the holder 32 and the other parts.

Depending on the type of the measuring points 11 on the workpiece 2, the number and arrangement of the calibration marks 13 or the mark carriers 14 may vary as well. The shape of the mark carriers 14 and the calibration marks 13 as well as the measuring marks 21 is also variable. In addition, the design of the mark holders 22, 23 is also variable. The positioning and the orientation of the measuring marks 21 and their mark holders 22, 23 on the calibrating body 15 are likewise variable. The dimensions may also be different. While specific embodiments of the invention have been shown and described in detail to illustrate the application of the principles of the invention, it will be understood that the invention may be embodied otherwise without departing from such principles.

What is claimed is:

1. A process for calibrating multiaxial measuring robots and a carried optical 3D sensor measuring device, within a said measuring station for vehicle body shells, the process comprising calibration taking place in a measuring cascade comprising:

calibrating the optical measuring device with the optical measuring device working point;

calibrating the measuring robot with the measuring robot axes; and subsequently calibrating the assignment of the measuring robot to the workpiece.

2. A process in accordance with claim 1, wherein the optical measuring device working point at the measuring robot is calibrated using an accurately positionable testing device with a reference sample, the sample being temporarily positioned in the area of the working point and is caused to overlap the working point by a relative movement in relation to the optical measuring device with the reference sample being subsequently measured to determine the space coordinates of the working point.

3. A process in accordance with claim 2, wherein for the recalibration of the optical measuring device the testing device belonging to is brought into position with the reference sample fixed in the desired position of the working point, and the agreement between the desired and actual positions is checked, wherein the optical measuring device is adjusted for correcting possible deviations or the reference sample and measured again to determine the space coordinates of the working point.

4. A process in accordance with claim 1, wherein the measuring robot with the robot axes is calibrated at a calibrating body with at least one measuring mark with a flat, rotationally symmetrical contour, wherein the measuring mark is approached with the optical measuring device from different directions and with different axis orientations of the measuring robot.

5. A process in accordance with claim 1, wherein the measuring robot for calibrating the robot assignment to the workpiece approaches and measures with the optical measuring device one or more the calibration marks at the workpiece and/or at the workpiece holder and/or at least at one mark carrier with a known position.

6. A process in accordance with claim 1, wherein a measuring coordinate system, in which the measurements are performed, is spanned at calibration marks.

7. A process in accordance with claim 6, wherein partial work spaces are generated during the calibration in the area of the calibration marks and in the area of measuring points on the workpiece.

8. A process in accordance with claim 1, wherein the measuring robot and/or the workpiece are moved relative to one another during the measuring in the normal measuring operation, wherein a calibration of the measuring robot is performed at the calibration marks after the movement before the next measurement.

9. A calibrating device for a multistep calibration of a multiaxial measuring robot and a carried 3D sensor optical measuring device, within a measuring station for the vehicle body shell workpieces, the device comprising:

a testing device for calibrating a working point of the optical measuring device;

a calibrating body for calibrating the robot axes; and a calibrating device for the calibration of the assignment of the measuring robot to the workpiece.

10. A calibrating device in accordance with claim 9, wherein the testing device has a holder for the temporary positioning of a reference sample in the area of the working point and an adjusting device for monoaxial or multiaxial relative adjustment between the reference sample and the optical measuring device.

11. A calibrating device in accordance with claim 9, wherein the holder is arranged detachably on a frame of the optical measuring device with an accurately positioned fastening.

12. A calibrating device in accordance with claim 9, wherein the adjusting device has at least as many adjusting axes as the optical measuring device has measuring axes, wherein the adjusting axes are directed corresponding to the measuring axes.

13. A calibrating device in accordance with claim 9, wherein the holder has a bent shape, wherein the adjusting device has one or more adjusting carriages associated with the adjusting axes.

14. A calibrating device in accordance with claim 9, wherein the reference sample is designed as a hole in a sample plate.

15. A calibrating device in accordance with claim 9, wherein the sample plate is designed as an adjusting carriage and has a fixing device.

16. A calibrating device in accordance with claim 9, wherein the calibrating body is arranged in the vicinity of the measuring robot and has at least one measuring mark with a rotationally symmetrical flat contour.

17. A calibrating device in accordance with claim 9, wherein the measuring marks are designed as small circular plates or openings.

18. A calibrating device in accordance with claim 9, wherein the measuring marks are arranged at a plurality of the individual upright and/or horizontal mark holders at the calibrating body and have an alternatingly different orientation.

19. A calibrating device in accordance with claim 9, wherein the calibrating device has one or more calibration marks at one or more stationary mark carriers arranged in a known position close to the workpiece and/or at a workpiece holder and/or at the workpiece.

20. A calibrating device in accordance with claim 9, wherein a plurality of the calibration marks are arranged in a group with a defined spatial distance from one another.

21. A calibrating device in accordance with claim 9, wherein the calibration marks have a flat circular contour and are designed as openings, small leaves or color marks.

22. A calibrating device in accordance with claim 9, wherein the measuring robot and/or the workpiece are arranged movably with at least one additional travel axis on at least one linear unit.

* * * * *